US006970937B1

(12) United States Patent
Huntington

(10) Patent No.: US 6,970,937 B1
(45) Date of Patent: Nov. 29, 2005

(54) USER-RELAYED DATA BROADCASTING

(75) Inventor: Dan Huntington, Washougal, WA (US)

(73) Assignee: Abacast, Inc., Washougal, WA (US)

( * ) Notice: Subject to any disclaimer, the term of this patent is extended or adjusted under 35 U.S.C. 154(b) by 740 days.

(21) Appl. No.: 09/882,816

(22) Filed: Jun. 15, 2001

Related U.S. Application Data

(60) Provisional application No. 60/212,111, filed on Jun. 15, 2000.

(51) Int. Cl.[7] .............................................. G06F 15/16
(52) U.S. Cl. ...................... 709/231; 709/203; 709/217; 709/238
(58) Field of Search ............................... 709/217–219, 709/236, 203, 224, 231, 238; 370/230, 468

(56) References Cited

U.S. PATENT DOCUMENTS 5,524,258 A 6/1996 Corby, Jr. et al.
5,586,264 A 12/1996 Belkrap et al.
5,864,854 A * 1/1999 Boyle .......................... 707/10
5,881,050 A * 3/1999 Chevalier et al. ........... 370/230
5,884,031 A 3/1999 Ice
6,336,115 B1 * 1/2002 Tominaga et al. .......... 709/203
6,374,289 B2 * 4/2002 Delaney et al. ............. 709/203
6,618,752 B1 * 9/2003 Moore et al. ............... 709/217
6,628,670 B1 * 9/2003 Galand et al. .............. 370/468
6,633,901 B1 * 10/2003 Zuili .......................... 709/203

* cited by examiner

*Primary Examiner*—David Wiley
*Assistant Examiner*—Phuoc H. Nguyen
(74) *Attorney, Agent, or Firm*—Marger Johnson & McCollom, P.C.

(57) ABSTRACT

User Relayed Broadcasting (URB) software creates a media file segmentation and distribution system for affordable broadband live media broadcasting over the Internet to vast audiences. It solves the bandwidth problem for live broadcast servers, eliminating the need to choose between quantity and quality when broadcasting live media over the Internet. URB receives a data stream from a conventionally-encoded media source, segments it into small files, uploads the files to users who re-upload them repeatedly in a chain-letter style multiplier network, and then plays the files back continuously through a conventional media player half a minute later. In effect it only simulates live broadcasting—it isn't live and it isn't broadcasting. It is file-sharing, or rather file-distributing, of media files using a very brief create-distribute-redistribute-play cycle and a time-synchronization protocol. Put simply, URB combines features of (1) live web-based media, such as Shoutcast or Icecast; (2) a file-sharing system similar to Gnutella or Napster; and (3) a cyberspace time-synchronization protocol.

2 Claims, 6 Drawing Sheets

Client/Server Routing Algorithm

Primary Broadcasting Computer:

Speed Test

Distributed Network Configuration

USER-RELAYED DATA BROADCASTING

CROSS-REFERENCES TO RELATED APPLICATIONS

This application claims the benefit from U.S. Provisional Patent Application No. 60/212,111 filed Jun. 15, 2000 whose contents are incorporated herein for all purposes.

BACKGROUND OF THE INVENTION

1. Field of the Invention.

This invention relates generally to data transmission methods and apparatus and more particularly to methods for distributing data files over a wide area network such as the World Wide Web using audience equipment as retransmission sites.

2. Description of the Prior Art.

Media broadcasts over the Internet come in two broad categories: Live, and On-Demand. The present invention is directed mainly to overcome the obstacles faced by providers of Live Internet broadcasts.

Delivering live broadcasts over the Internet requires very high capacity servers. Not only are media streams greedy consumers of bandwidth individually, every member of the audience requires a separate stream to be uploaded from the host, placing increasing demands on the server. Host servers must be capable of delivering massive amounts of data directly to the backbone of the Internet. A popular radio station may spend thousands of dollars per month in bandwidth and server costs in order to be available on demand to a sufficient audience. Without banks of high-capacity servers, live broadcasters have to limit the size of their Internet audiences or allow their audiences to experience quality problems including interruptions of service.

This means that live broadcasts over the Internet, though popular, are problematic and expensive to deliver. Meanwhile other methods of Internet media delivery have benefited from recent dramatic advances in technology. For example, using a program or a service like Gnutella, Napster, or Scour with a broadband Internet connection, you can find and download a song in perfect stereo in less time than it takes to listen to it. The need remains for a method to bring live broadcasts to the advanced level of other media distribution methods.

SUMMARY OF THE INVENTION

User-Relayed Broadcasting (URB) automatically turns a large audience into an even larger server base. Rather than attempting to upload data-rich media streams individually to each and every listener (or viewer in the case of video), URB lets each new member of the audience serve a few or many more members.

URB creates peer-to-peer networks radiating over the Internet from media broadcasters. Each "broadcaster" is the center of a separate media file distribution network in which at least a large minority of the clients on the network perform as servers as well. Thus the listeners function as subsidiary hubs for the network.

The foregoing and other objects, features and advantages of the invention will become more readily apparent from the following detailed description of a preferred embodiment of the invention that proceeds with reference to the accompanying drawings.

DETAILED DESCRIPTION OF THE PREFERRED EMBODIMENT

Figure 1:
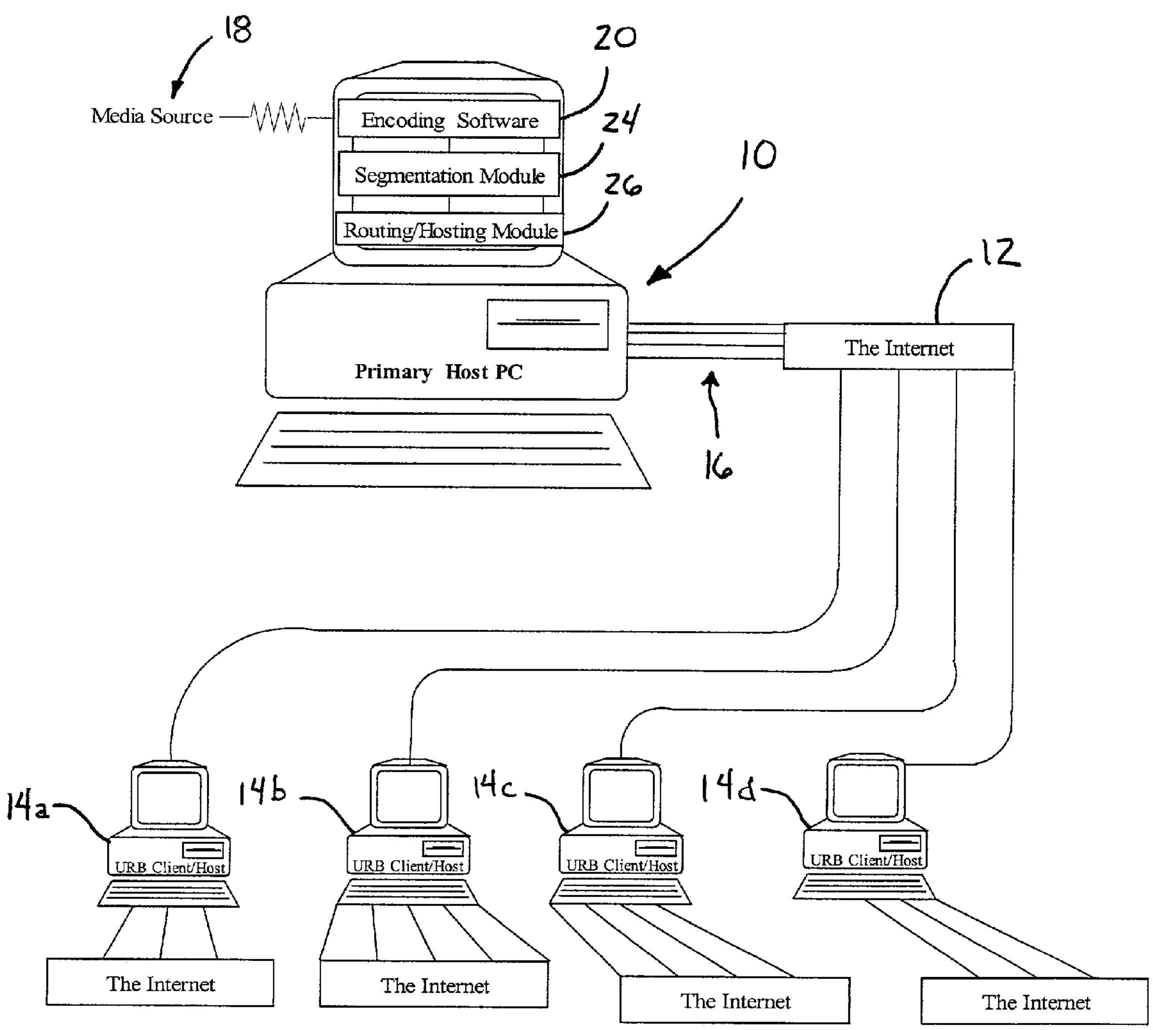
FIG. 1 is a block diagram illustrating URB client/host computers in relation to a primary host computer.

FIG. 1 illustrates a first level of the URB network constructed according to a preferred embodiment of the invention. The network includes a primary host computer 10 coupled over a wide area network, such as the Internet 12, to a plurality of downstream client computers, such as client computers 14*a*, 14*b*, 14*c* and 14*d*. The recommended minimal components of host computer 10 are described below, however it is understood by those knowledgeable in the art that other configurations can be used:

Broadcasting Components:

(1) Modern multi-media personal computer 10—A standard multimedia PC is adequate for broadcasting high-fidelity stereo URB audio: Pentium 200 MHz, 32 Mb Ram, 16-bit stereo soundcard is the bare minimum requirement with modem or other internet connection 15. A high-speed processor is recommended. Video broadcasts will typically require stronger equipment.

(2) Broadband Internet Connection 16—Good performance depends on the upload capacity of a DSL, Cable, T1 or other high-speed connection. Broadcasters anticipating an audience in the tens of thousands or larger will locate at a fat pipe Internet node. Amateur and other broadcasters expecting small audience may get by with a dial-up modem.

(3) Conventional web browser and related software operating on host computer 10.

(4) Media Source 18—this can be any recorded or live audio or video feed intended to be available for simultaneous distribution to an audience larger than one. URB is not designed for on-demand delivery of canned media, it is designed for broadcasting media as scheduled by the host or broadcaster, like a traditional broadcast station.

(5) Encoder Software 20—the media is converted into a data stream using a conventional codec, such as MP3, WindowsMedia, RealAudio, Icecast, etc.

(6) URB Broadcasting Software:

1. Timing Module 22 [FIG. 2]—The Coordinated Universal Time (UTC) is downloaded from an available web site such as wwnw.time.gov and used to set an internal timer for tagging the tranches in the Segmentation Module.
2. Segmentation Module 24—Divides the media stream from the encoder into separate, discrete tranches that include time, sequencing, and identification brackets (See Time Sequencing Synchronization Protocol—TSSP).

3. Routing Module 26—Receives the requests for service as users log on. Directs users to the Hosting Module 28 in order as they log on. Monitors the speed ranking and log-on order of each client. When the host reaches its upload capacity the Routing Module 26 determines what to do with each additional client upon log-on, selecting which users to host directly by displacing existing clients and directing all other users to the appropriate client for downstream hosting. Maintains overall operating efficiency of the network by following a prioritization algorithm for routing users based on their upload capacity and log-on order (see Speed Ranking System and Client/Server Routing Algorithm).
4. Hosting Module 28 [FIG. 2]—Uploads the tranche streams in a conventional HyperText Transfer Protocol (HTTP) to other users.

In operation, a new user logs on to the host computer's IP address to request service. The request enters the host computer through the Internet connection and is fielded by the Hosting Module 28. If the host has remaining upload capacity, the new user is hosted directly by the Hosting Module. If the host is full, the request is referred to the Routing Module 26 which takes the user data, performs a PING test with the new client to adjust the speed ranking if necessary, and follows the client server routing algorithm (CSRA) described further below to decide what to do with that request—either send it right back to the Hosting Module to exchange for a slower client (the slower client then gets sent over to the Routing Module) or send it to one of the clients already receiving a tranche stream to be hosted or routed by that client.

Figure 3:
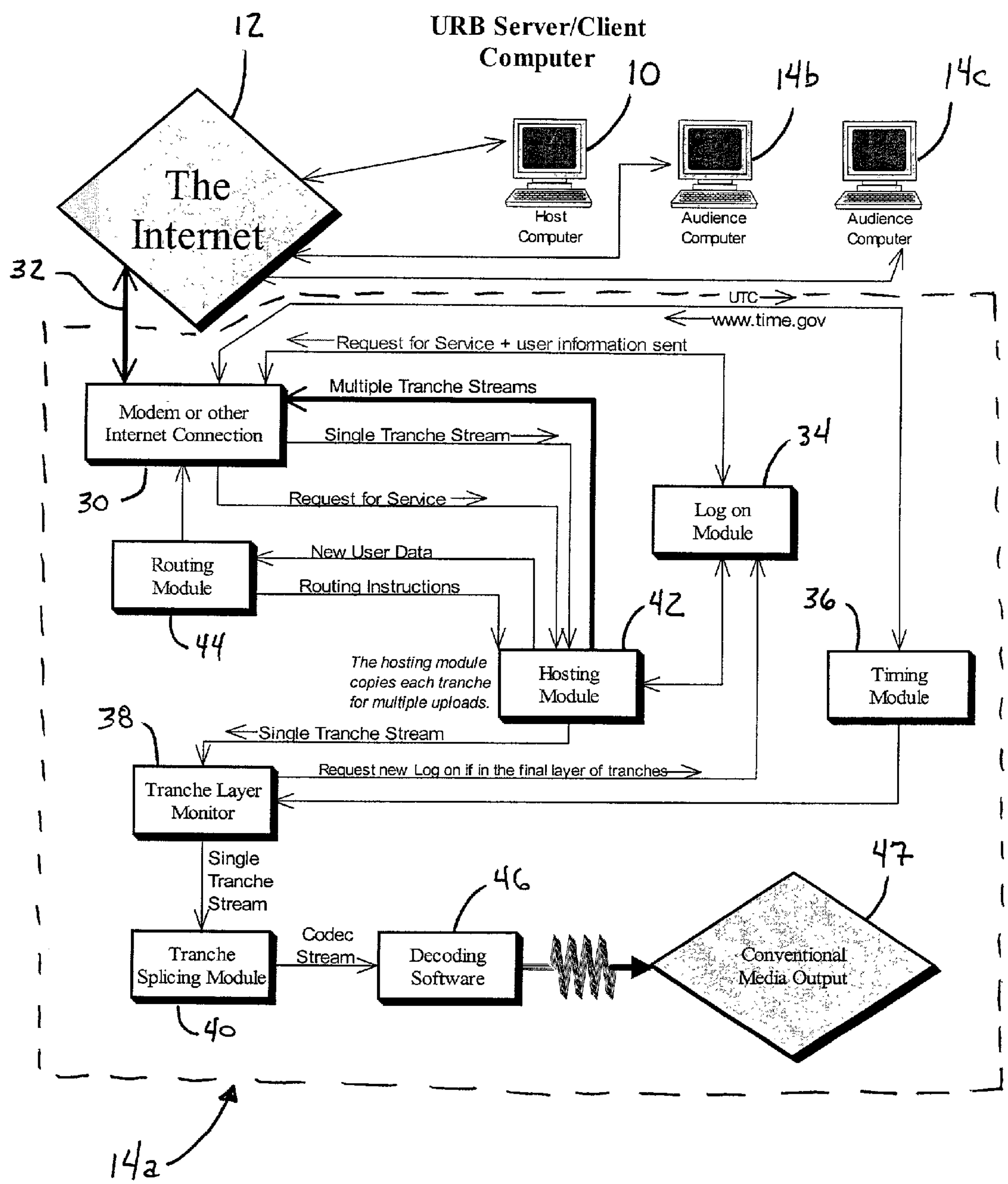
FIG. 3 is a block/flow diagram illustrating the operation of the URB client/host computer from FIG. 2 according to the invention.

Receiving Components:

A schematic block diagram illustrating the components of a client computer, shown generally at 14*a* and bounded by the dashed line, including client software constructed according to a preferred embodiment of the invention is shown in FIG. 3. The recommended minimal components of client computer 14*a* are described below, however it is understood by those knowledgeable in the art that other configurations can be used:

(1) Modern multi-media personal computer 14*a*—A standard multimedia PC is adequate for receiving high-fidelity stereo URB audio: Pentium 200 MHz, 32 Mb Ram, 16-bit stereo soundcard is the bare minimum requirement with modem or other internet connection 30. A higher speed processor is recommended. Video will require stronger equipment.

(2) Internet Connection 32—A minimum speed of 56 k is recommended for audio.

(3) Conventional Web Browser and related software.

(4) URB Receiving Software:

1. Log-on Module 34—Logs onto a primary host site using the browser, reports its speed ranking (See SRS below) to the host, requests a tranche stream, and follows routing instructions to the appropriate server for downloading.
2. Timing Module 36—Downloads the Coordinated Universal Time (UTC) from www.time.gov and sets an internal timer for synchronizing the approximate playback time during tranche splicing.
3. Tranche Layer Monitor (TLM) 38—Compares the time stamps bracketing the incoming tranches with the present time. This controls how many tranches are held in the computer's random access memory before feeding into the splicing software. It also renews the log-on procedure whenever there is only one tranche held in the RAM buffer, indicating the user has been pushed out to the outermost layer (see CSRA below).
4. Tranche Splicing Module (TSM) 40—Matches the time sequence brackets (n, n+1) and recombines the tranches for continuous playback in the right order at the right time (see TSSP below).

(5) URB Relay Hosting Software:

1. Hosting Module 42—Once the user is receiving the tranche stream from the primary or an intermediate client-server, this software uploads streams to new users by a conventional HyperText Transfer Protocol (HTTP) or FTP as in the step outlined above for broadcasters.
2. Routing Module 44—Once the user reaches its upload capacity, this determines which users to host directly by displacing an existing client and directs all other users to the appropriate client for downstream hosting as in the step outlined above for broadcasters.

(6) Media Player 46—The continuous codec produced by the splicing software in (4) above is fed into a media player compatible with the encoder used by the primary host server. The player plays the audio or video as a continuous "live" broadcast.

The user 14*a* shown in FIG. 3 logs onto an IP address to receive a media broadcast. Not shown here is the routing done by the primary host and any other servers upstream—however, such techniques are well known within the art and are not repeated here. The user receives a tranche stream and new requests for hosting from whatever host it is directed to. The Hosting Module 42 duplicates the incoming tranches, one for sending to the Tranche Layer Monitor 38 and the others for uploading to new clients it serves following the Client/Server Routing Algorithm (CSRA) in the Routing Module 26.

The Tranche Layer Monitor 38 compares the scheduled playback time of the arriving tranches with the clock in the Timing Module 22 to determine b as described below. The tranches are held in the client computer RAM for the period called for by b. If the Tranche Layer Monitor 38 finds that the user is in the outermost layer of tranches, (b=0), it waits a random length of time between zero and 42 seconds then directs the Log-on Module 34 to request a new upstream client as a new host. When the tranches have been held in buffer for the appropriate period, they are streamed into the Tranche Splicing Module 40, which strips the brackets (e.g. header information from the packet) off the tranches and recombines them into a continuous codec Stream which is fed into the media player's decoding software 46 to produce the conventional media output 47.

Speed Ranking System (SRS):

A speed test can be performed on the client computer during URB initialization to determine and log the connection speed of the client into a database stored within the host computer 10. The URB installation program logs onto the URB Speed Test Site 48 to receive a data packet to forward on as a simulated test broadcast to measure the user's actual upload performance. The Relay Sites 52*a–e*, located at diverse efficient nodes throughout the Internet, measure the elapsed time it takes to receive the data packet from the new user and forwards this information to the Speed Test Site 48. The purpose of this procedure is to ferret out which new users should be given a preferential ranking—only a time fraction of all users. The ranking resulting from the test will be sent out along with a request for service. The ping rate will be used to temporarily lower a user's priority when the connection is not performing well.

Figure 4:
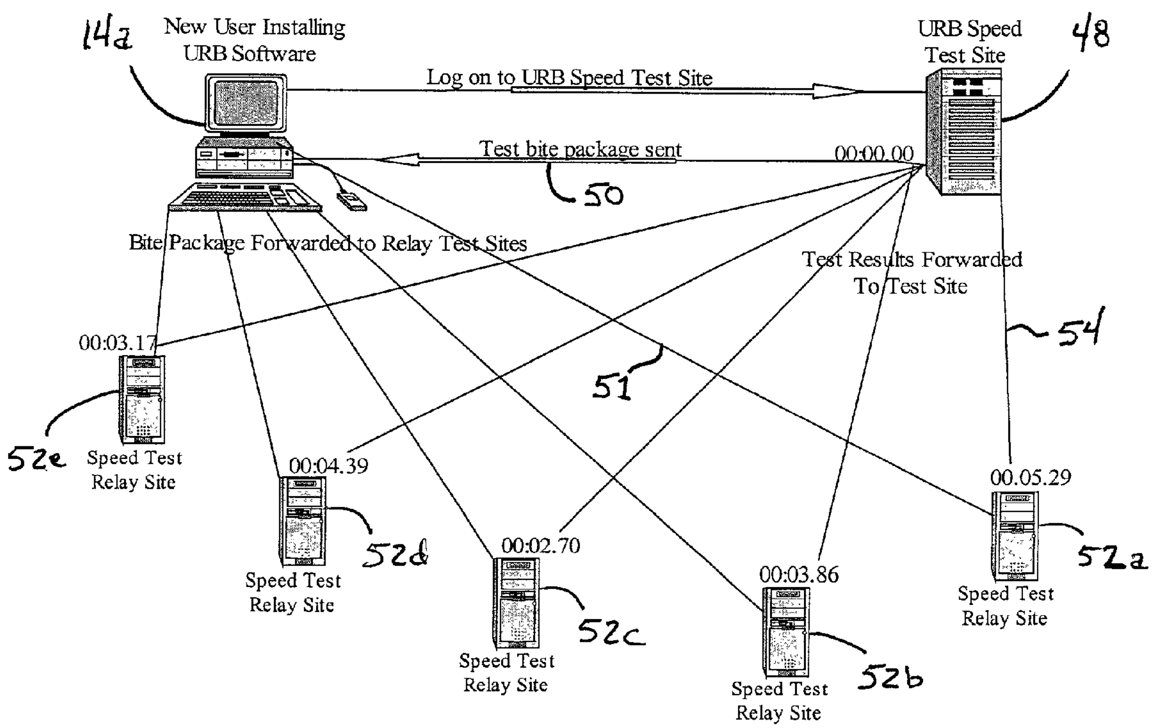
FIG. 4 is a block diagram illustrating the method used for speed testing the connection speed of a user/rebroadcaster for insertion into a network arranged as in FIG. 6.

Turning to FIG. 4, during the URB software installation and setup procedure, users 14*a* log onto a URB speed test site 48. This site 48 sends a time signal 50 to the user's computer with directions to relay 51 the signal simultaneously to several relay sites 52*a–e* maintained for the test at broadly-distributed high capacity locations on the Internet. Each recipient site 52*a–e* reports back 54 to the URB test site 48 with the elapsed time it took to complete the delivery. The test site then assigns a speed ranking number to the new user factoring in the average result and the worst result. A minimum of three different ranks will be used, for example 1r for the users with a connection speed that places them in the fastest 0.25% of all users, 2r for the next fastest 4.75%, and 3r for everyone else. This ranking number is downloaded onto the new URB user as a cookie.

This ranking is further modified by each server. When a user logs on, if the ping rate is slow the ranking is degraded accordingly.

Figure 5:
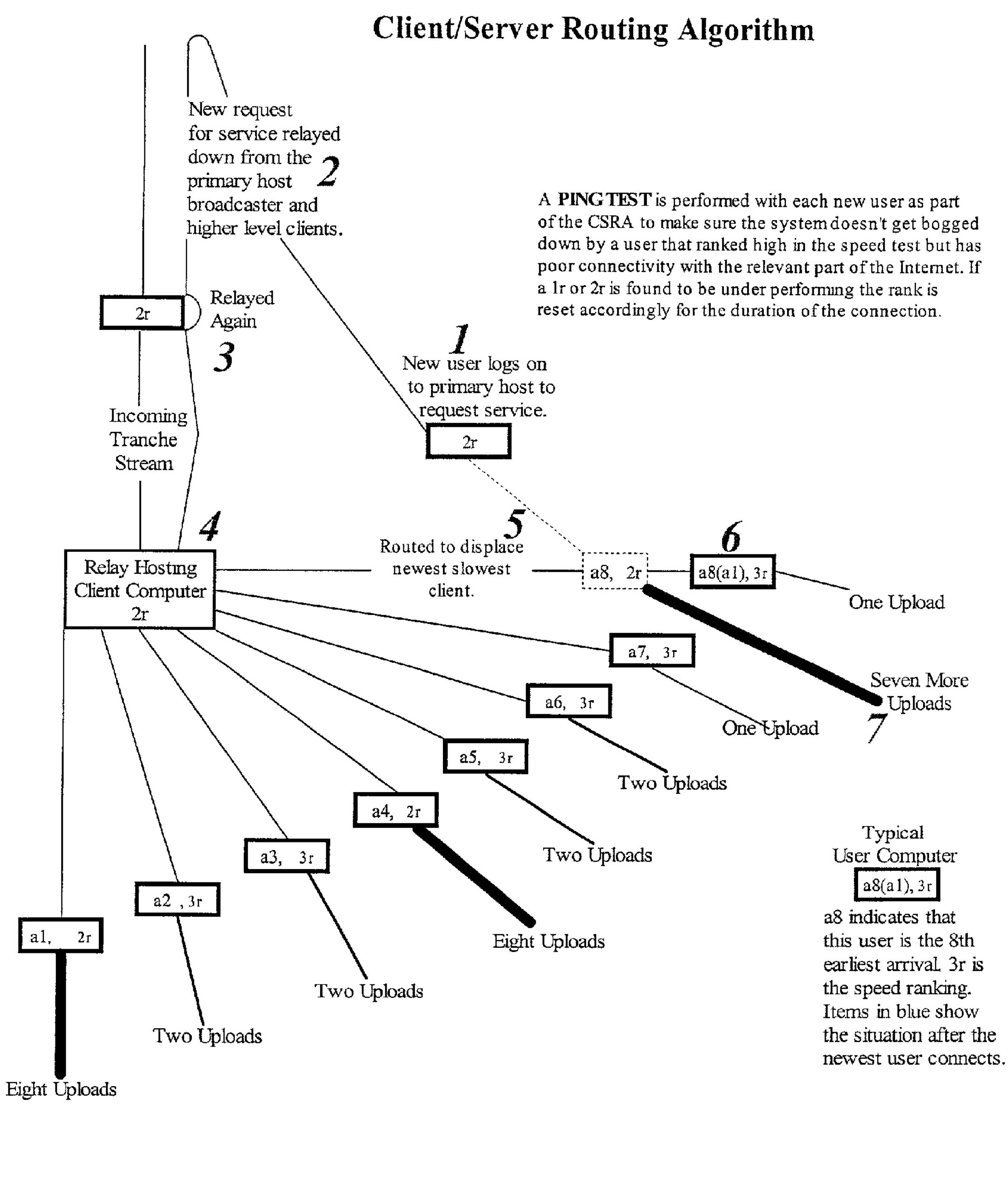
FIG. 5 is a block diagram illustrating the client/server routing algorithm configured according to a preferred embodiment of the invention.

Client/Server Routing Algorithm (CSRA):

FIG. 5 illustrates a portion of an in-service URB network two or three tiers out from the main server, showing the preferred method for inserting new clients within a peer-to-peer network construct. All users are served on a first-come first-served basis, regardless of speed ranking until a host (primary broadcaster or user broadcaster) reaches its upload capacity. The Routing Module 44 keeps track of each user's speed ranking and the order in which it made its request.

The ranking protocol operative within the CSRA is the 1r, 2r, 3r method described in more detail below. At (1), a 2r user logs onto the main host which is at capacity serving all 1r or 2r clients. At (2), the routing module on the broadcast server relays the request to one of its clients according to the CSRA. That client is also at capacity serving equal or faster clients so the request is relayed yet again (3) to the host (4) featured in FIG. 5. This client host is at capacity too, but not all its clients have a slower ranking than the new client. The routing module uses the CSRA to target the most recently arrived user with the slowest ranking (the highest a value of all the 3r's) and displaces that client (5), sending him and all his clients one layer downstream (6). The next seven requests coming in to the host at (4) are sent on to the new 2r client regardless of speed ranking.

Put another way, when the host is operating at its upload capacity and another user requests hosting, the Routing Module 44 compares the speed ranking of that latecomer with the rankings of the users already being hosted. The routing algorithm starts with the newest user and progresses backward chronologically, looking successively for the slowest-ranked users (for example 3r) first, then the next slowest.

If it finds a slower client it inserts the new client in the slower user's place, pushing the slower client and all the clients it is hosting one level downstream. The new higher-ranked client will receive all subsequent equal and slower clients routed by the host until reaching the number of users appropriate for its speed ranking.

If the latecomer's rating is equal to or slower than all the existing clients, it gets routed to the next client due to receive a user based on the distribution algorithm. The distribution algorithm sends one new user at a time to each existing client in time-sequential order, again newest to oldest. Slower-ranked users are skipped over a fraction of the time. For example, under the 1r, 2r, and 3r system if 1r's can handle four times the traffic of 2r's which can handle twice the traffic of 3r's then the algorithm skips over the 2r's three cycles out of four and it skips over the 3r's seven cycles out of eight.

A user in the final tier will experience a break in the tranche stream if any upstream user is displaced. In order to minimize this exposure, the Tranche Layer Monitor 38 [FIG. 3] automatically makes a new request for a server (logs on again) when it finds itself in that final tranche. The first request is made after waiting a random length of time between zero and 42 seconds. The program then directs an inquiry to the primary host server 10. The request is cycled through the routing system as if it were an inquiry from a new user. If the request returns a position that is still in the final tier the program waits forty-two seconds and tries again. When a higher-level connection is located the final-tier user switches to the higher-tier server and abandons its old connection.

Figure 6:
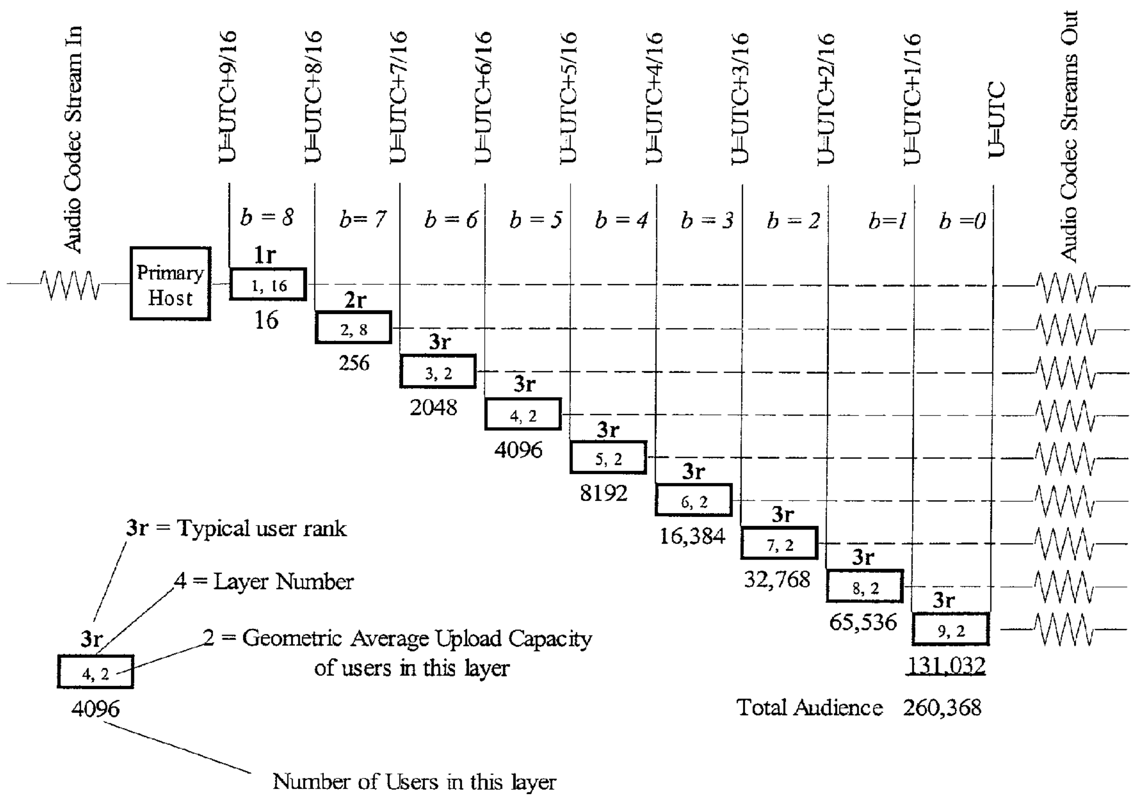
FIG. 6 is a diagram illustrating the distribution of users/rebroadcasters over a network arranged according to an embodiment of the present invention.

Distributed Network Configuration:

URB distributes media files by cascading them through a multi-level network of subsidiary user-hubs. An example of this multi-level network constructed according to the practices of the present invention is shown in FIG. 6. The more levels in the network the larger the audience capacity and the longer the playback delay. FIG. 6 shows a functioning example of a URB network operating at its theoretical capacity limit. The primary host computer has an upload of simultaneous feeds. Users in the first layer—16 people out of an audience of 260,000—have the same capacity (about 300 k/sec). The other 256 users in the second layer have one-half that capacity and provide 8 simultaneous uploads. Half of the other 260,000 users are able to provide 2 uploads each, the other half are not serving as rebroadcasters at all.

The primary server creating the tranches determines how many tiers will be in the network and sets the U factor accordingly. For example, with 1⁄16 minute tranches, a U factor of 9⁄16 minute after the UTC of the actual live feed results in eight layers (nine counting the non-relaying final tier) with a network delay of about 34 seconds (9⁄16 minute). U can not be set at less than 3⁄16 minute or more than 15⁄16 minute after the original UTC.

Consider a popular broadcaster located at a site where tranches can be uploaded at 300 k. To avoid congestion, no more than 90% of the capacity should be used –270 k. This supports 16 feeds of MP3 audio (about 16 kbps each) so in a full network there will be 16 users in the first tier. CSRA assures that each of these 16 users will have a high capacity too, say 16 simultaneous uploads, resulting in 256 (16×16) users in the second tier. The second tier users may be slower, averaging a capacity of eight uploads. This gives the third tier 4096 users (8×256). If the geometric average capacity of the third through eighth tier users is 38 k (two uploads) then the theoretical audience limit for this network is 260,368 (16+16×16+16×16×8+16×16×8×2+16×16×8×2×2+16×16×8×2^3+·^4+·^5+·^6). The final tier need not have any upload capacity at all. That means 131,072 (16×16×8×2̂6) users more than half the total, could be using slow dial-up modems with almost all the other users using fast dial-ups.

If a quarter million member audience is still too small, the broadcaster can use a very high capacity server. There is a theoretical multiplier effect of 16,273 in the described network comprised of users with a few fast and many slow connections. Broadcasting from a server with an upload capacity of 150 simultaneous streams would serve 2.4 million computers. Another way to increase the capacity is to go to a U factor of 10/16, adding another tier to the network in exchange for four more seconds' delay. In the present distribution of Internet connections this would result in perhaps an eight-fold capacity expansion, reaching 2.1 million users.

As more and more users gain access to fast Internet connections the speed and efficiency of the URB network will increase exponentially.

File Segmentation Protocol:

The output from a media encoder is broken into discrete files bracketed with segmentation codes. These discrete files, each containing the data for a few seconds' worth of media, are called tranches. Each tranche is comprised as follows: s;U;n;M;n+1 where:

s=source stream data, as in WABC-FM and program information.

n=the tranche order in the series, an integer cycling continuously between 0 and 15, with 15+1=0.

U=the coordinated universal time at which the tranche is to start playing.

M=media file containing 1/16 minute of codec media.

There is a deliberate redundancy built into the system. n is a function of U, being tied to the sixteenth of a minute, and n+1 is a function of n. If M is MP3 audio each tranche will contain about 64 kb of data.

Time Sequencing Synchronization Protocol (TSSP):

Upon logging on to receive a broadcast, the program downloads the UTC from www.time.gov (or another time site) and sets the internal clock in the Timing Module 22. Primary hosts 10 set their clock at the start of each broadcast and continue to monitor their timing by comparing the internal clock with the time site periodically. If a broadcaster's clock drifts away from true time the speed of the clock is adjusted accordingly. The timing protocol is not precise enough to be affected by these adjustments. They are made only to keep the tranche layering synchronized for broadcasters operating 24 hours a day.

Figure 2:
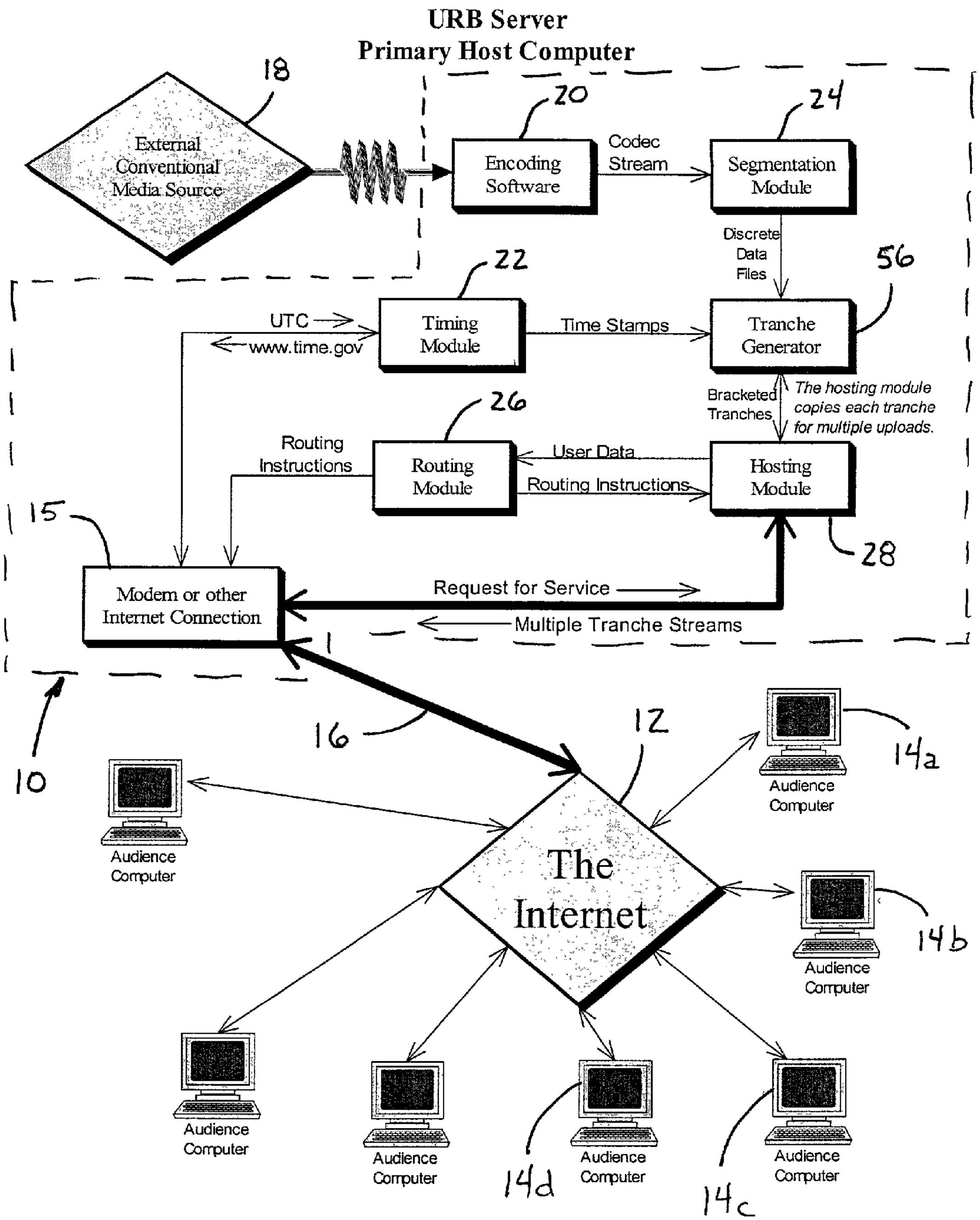
FIG. 2 is a block/flow diagram illustrating the operation of the primary host computer from FIG. 1 according to the invention.

The tranche creator 56 [FIG. 2] in the Segmentation Module 24 takes the UTC that corresponds to the real beginning time of each segment and adds the U factor to determine U, the UTC at which the tranche is to start playing. The typical configuration will accommodate eight tiers of client/servers and one more final tier of clients. This requires the U factor to be 9/16 of a minute, so U=UTC+9/16 minute. In the next step n is calculated as a function of U. The n value for the tranche beginning during the first U in each minute is 0, the next n value is 1 and so on, with 15+1=0. The Segmentation Module attaches U, n, and n+1 along with the source stream information to the tranches as brackets.

During playback the Tranche Layer Monitor 38 [FIG. 3] compares U with UTC to determine b, the number of tranches to be held in the buffer before feeding into the Tranche Splicing Module 40. Playback timing is controlled precisely by b and n, NOT U OR UTC. Let's look at how this works:

Say a user logs onto a popular site and happens to be routed to the sixth tier of users. There are five user-hubs, e.g. 14_a_, between it and the primary host 10. The Tranche Layer Monitor 38 checks the brackets on the first tranche as it is downloaded and subtracts UTC from U, resulting in 3/16 minute when rounded off to the closest sixteenth.

The generic formula is:

b=(U−UTC)×16/minutes: ROUNDED TO THE NEAREST INTEGER.

where b will be an integer between 0 and 8. In this example b is 3, directing the Tranche Layer Monitor 38 to keep three tranches in the buffer before running them through the Tranche Splicing Module 40.

The sequence of tranches arrives in the right order but not at precisely the right instant. There are gaps and even overlaps. This is why the n and n+1 brackets are needed. n is an integer cycling progressively from 0 to 15, with 15+1=0.

Back to the example. The TLM looks at n in that first tranche and adds b to it. Let's say n in this arriving tranche is 14. 14+3=1, so the TLM 38 sits on that first tranche until the moment a tranche that has n=1 arrives, about 3/16 minute later. Then it sends the tranche to the Tranche Splicing Module 40, beginning the continuous playback.

Once playback has begun the TLM it continues to compare U on each incoming tranche with UTC. If it finds that U=UTC the CSRA has bumped the user into the final tier and a new request for service is sent after waiting a random length of time between 0 an 42 seconds. Meanwhile, the Tranche Splicing Module keeps on playing by matching the n+1 bracket of the tranche it is playing with the n bracket of a trance in the buffer. The TSM functions fine no matter what layer the user is in. After the initial playback has begun the user can bounce all over the place. It may be displaced by a faster user, pushing it one layer back. An upstream user may be bumped downstream, it doesn't matter. The TSM just keeps splicing the tranches together whenever n+1 in the playing tranche equals n on a tranche in the buffer.

If an upstream user disconnects, the TLM notices that there is no U all of a sudden and immediately logs back on with a request for service. The TSM keeps playing from the buffer and a new tranche stream starts arriving from another host on the network. The n values keep the flow going.

Fudge Factor—In development testing it may prove helpful to add a couple seconds to all U factors so there is spare buffering capacity in the system.

Having described and illustrated the principles of the invention in a preferred embodiment thereof, it should be apparent that the invention can be modified in arrangement and detail without departing from such principles. I claim all modifications and variation coming within the spirit and scope of the following claims.

GLOSSARY

Codec: (coder/decoder or compression/decompression) —A standard method of coding and decoding media data.

CSRA: Client/Server Routing Algorithm—The method followed in URB to make efficient use of host/clients.

DSL: Digital Subscriber Line—A high-speed internet connection using conventional copper telephone wires. Its typical bandwidth capacity ranges between 128 k and 768 k.

FTP: File Transfer Protocol—A method of moving files from system to system using TCP/IP.

Gnutella: A serverless peer-to-peer file sharing program in which users are hubs.

HTTP: HyperText Transfer Protocol—The method of moving data from system to system. Tells the program looking at the data how to use it.

Icecast: An open-source streaming audio system based on MP3 audio compression technology, similar to Shoutcast.

MPEG: Moving Pictures Expert Group—A format for compressing video.

MP3: Short for MPEG Audio Layer 3, a compression standard for music.

MP4: Also referred to as Divx—A new and very efficient video compression standard.

Napster: A proprietary server-based MP3 file sharing system.

PING: Packet Internet Gopher—A standard suite of TCP/IP protocols that checks connectivity between devices.

RealAudio: A leading provider of codec services.

Shoutcast: A proprietary Winamp—based distributed streaming audio system.

SRS: Speed Ranking System—Provides a numerical ranking of a user's likely upload capacity for the URB system.

Tranche: Discrete files containing a few seconds of compressed media bracket by identification and timing codes in the URB system.

TLM: Tranche Layer Monitor

TSSP: Time Sequencing Synchronization Protocol—The method URB developed to play downloaded Tranches back at the right time in the right order.

URB: User Relayed Broadcasting—Provides live media broadcasts over the Internet to vast audiences without requiring powerful servers. It simulates broadcasting by distributing media files over a peer-to-peer network using a very brief create-distribute-play cycle and TSSP.

UTC: Universal Coordinated Time—A standardized global time, also called World Time and formerly called Greenwich Mean Time.

Winamp: A proprietary high-fidelity music player that supports MP3 and Shoutcast.

WndowsMedia: Microsoft provider of codec services.

AW: basically the way I'm designing the system based on your idea, is that its going be like a codec, because that pipes the stream to the other codec. For example in winamp, you install a DSP program, that steams the data out to the internet, but to get the stream data from the system, you need to have some program that logons to the server and sense all the data and your connection info and such and then pipes the steam to your codec.

What is claimed is:

1. A method for arranging nodes within a wide-area network for peer-to-peer delivery of live content over the network, said network having at least a primary host computer and at least three client/server tiers comprised of a plurality of client computers, the method comprising:

storing a current network configuration for the three client/server tiers on the primary host computer including a speed ranking for each of the client computers;

receiving at the primary host computer a request over the network from a new client computer for content;

performing a connection speed testing operating on the new client computer to obtain a speed ranking for the new client computer;

comparing the speed ranking of the new client computer with the speed ranking of at least one of the client computers; and based on this comparison, inserting the new client computer within one of the three client/server tiers to form a new network configuration wherein the primary host computer serves content to a first tier of the three client/server tiers, client computers of the first tier serve content to a second tier of the three client/server tiers, and client computers of the second tier serve content to a third tier of the three client/server tiers;

the method further including the steps of:

comparing the speed ranking of the new client computer to each of the plurality of client computers within the network; and if the new client computer has a speed ranking equal to or slower than the plurality of client computers, then connecting the new client computer as a client node for receiving content from a selected one of the plurality of client computers within the network, where the selected one of the plurality of client computers to which the new client computer is connected is determined by:

storing on the primary host computer an order among each of the plurality of client computers for issuing a request for content to the primary host computer;

determining a most recent one of the client computers to issue a request for content;

assigning a probability of selection to the most recent one of the client computers based upon a tier location of the most recent one of the client computers;

selecting or not selecting the most recent one of the client computers according to the probability; and if not selecting the most recent one of the client computers, determining a next most recent one of the client computers and performing the assigning and later steps.

2. The method of claim 1, wherein the probability of selection is one out of four for client computers located in the second tier and one out of eight for client computers located in the third tier.

* * * * *